United States Patent [19]
Desjourdy

[11] Patent Number: 5,041,970
[45] Date of Patent: Aug. 20, 1991

[54] CELL PROCESSOR AND MEMORY-MANAGED COMPUTER SYSTEM USING SAME

[75] Inventor: Russell R. Desjourdy, Millville, Mass.

[73] Assignee: Intelligent Computer Engineering, Inc., Hopedale, Mass.

[21] Appl. No.: 242,481

[22] Filed: Sep. 9, 1988

Related U.S. Application Data

[63] Continuation-in-part of Ser. No. 227,814, Aug. 3, 1988, Pat. No. 4,969,085.

[51] Int. Cl.$^5$ ............................................. G06F 13/00
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 4,101,960 | 7/1978 | Stokes et al. | 364/200 |
| 4,296,466 | 10/1981 | Guyer et al. | 364/200 |
| 4,736,319 | 4/1988 | DasGupta et al. | 364/200 |

*Primary Examiner*—Thomas M. Heckler
*Attorney, Agent, or Firm*—Iandiorio & Dingman

[57] ABSTRACT

A cell processor and memory-managed computer system using the same includes a processor module for interacting with a memory module. Within the memory module a plurality of groups of information are stored. Each group includes a data sector for storing a word, a vector sector for storing a vector word that links that group with at least one other group, and a function sector. The function sector includes an operation field for storing an operation word that indicates the operation to be performed by the processor module on the data word and a state field for storing a state word that represents the condition of that group for processing. When enabled by the memory module, the processor module processes a group of information designated by the memory module as ready for processing. It also selectively processes at least one of the words of the designated group. The processor module includes an address generator for identifying, based on the processing of one or more words in the designated group, a group of information to be accessed and processed. A process manager is responsive to the address generator and the group of information processed for assembling an access request for the identified group and for transmitting the access request to the memory module to provide new information to the memory module or to request additional information from the memory module.

25 Claims, 9 Drawing Sheets

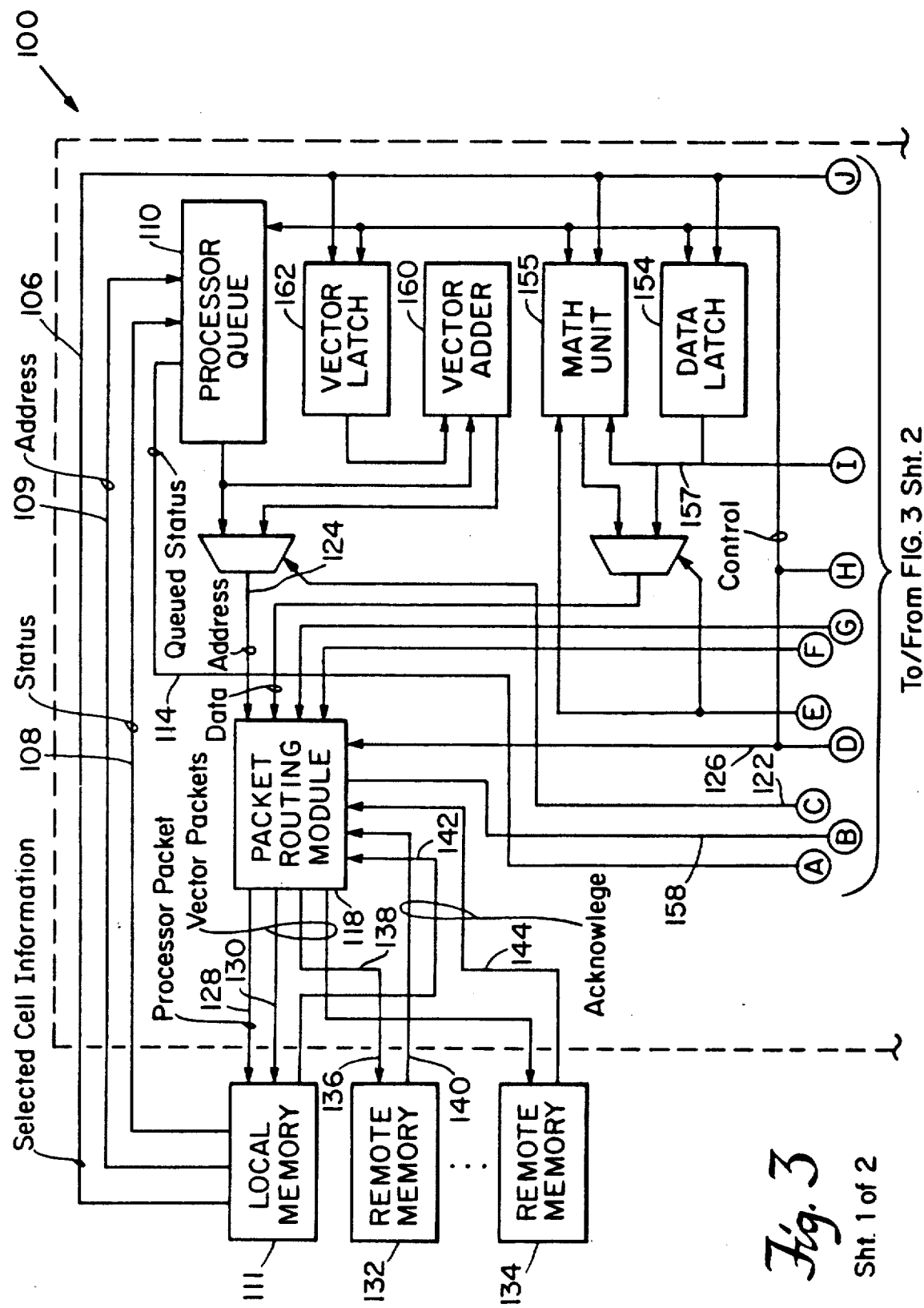
Fig. 3 Sht. 1 of 2

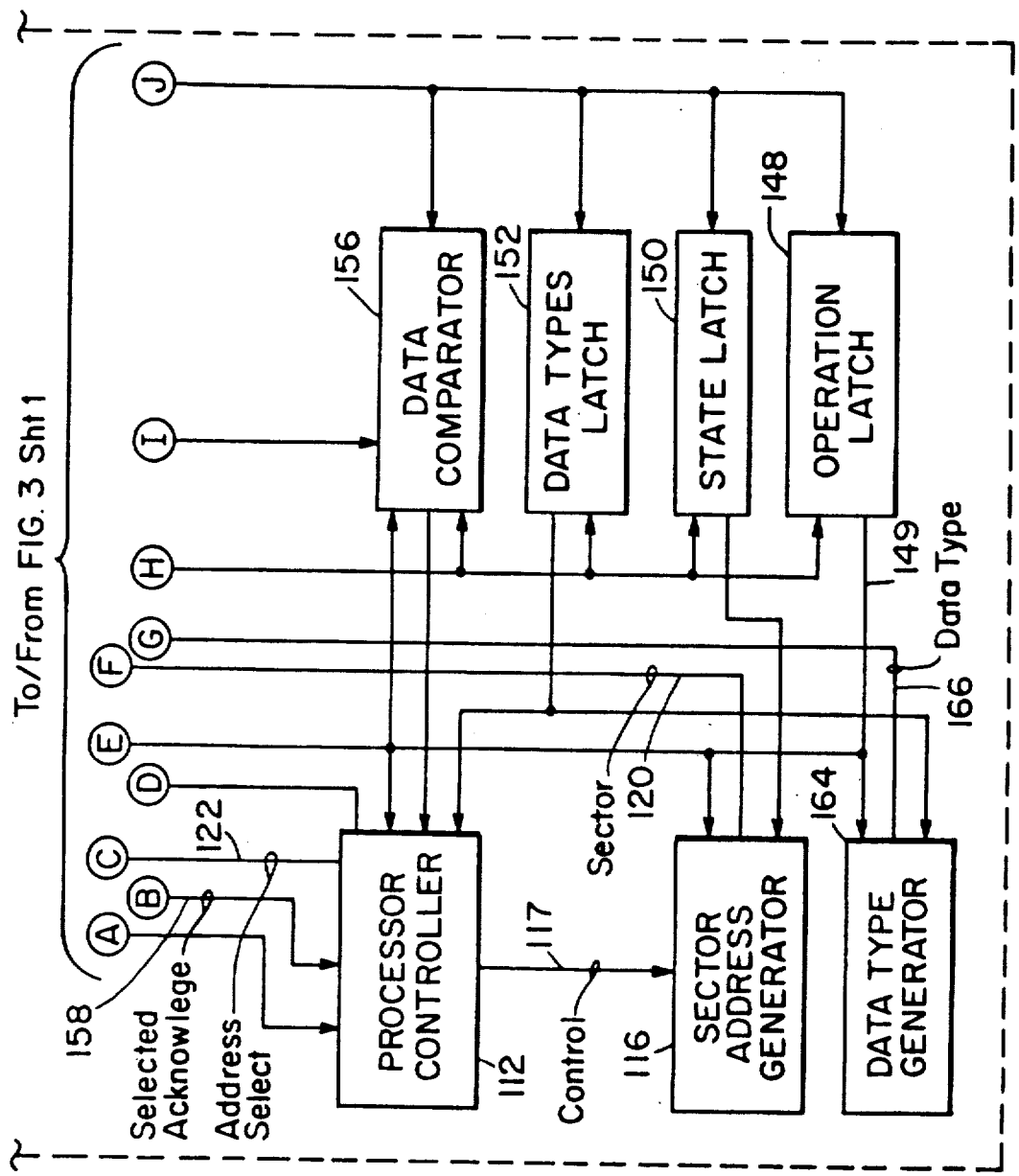
Fig. 3 Sht. 2 of 2

Fig. 5

*=LOADED_ON_TRUCK

0: (AVAILABLE_TRUCK_SPACE)

| 1000 | |
|---|---|
| VAR | +6 |
| +3 | +3 |

1: (CARGO_SIZE)

| 521 | |
|---|---|
| VAR | +7 |
| | |

2: (CARGO_STATUS)

| ? | |
|---|---|
| VAR | |
| | +1 |

A: (VARIABLE_NAME)

| XDAT | YDAT |
|---|---|
| FUNC | |
| AVEC | BVEC |
| CVEC | DVEC |

3:

| ? | ? |
|---|---|
| GRT | |
| +1 | -3 |
| | -2 |

4:

| | |
|---|---|
| REQ | |
| +1 | +3 |
| | |

5:

| ? | |
|---|---|
| SET | |
| -5 | |
| +1 | |

6:

| ? | ? |
|---|---|
| SUB | |
| -1 | |
| -6 | -5 |

7:

| * | |
|---|---|
| SET | |
| -5 | |
| | |

8:

| ? | |
|---|---|
| SWP | |
| -5 | -2 |
| | |

CELL PROCESSOR AND MEMORY-MANAGED COMPUTER SYSTEM USING SAME

RELATED APPLICATION

The following application is a continuation-in-part of U.S. patent application Ser. No. 227,814, filed Aug. 3, 1988, entitled "Memory Module for a Memory-Managed Computer System", by Russell R. Desjourdy, now U.S. Pat. No. 4,969,085.

FIELD OF INVENTION

This invention relates to a processor for a computer system and more particularly to a processor which is controlled by memory for accessing information stored within the memory.

BACKGROUND OF INVENTION

A computer system generally consists of a processor and a memory. During a processing operation, the processor has the responsibility of locating and managing information in memory that is necessary for solving the problem at hand. In other words, memory operates as a slave to the processor and only supplies information to the processor when requested. A problem with this construction is that the processor is not free to process other information while locating or managing the information in memory to be processed.

For larger scale problems requiring high computational demands, parallel processing systems which include multiple processors have been developed for simultaneously solving various aspects of a problem. These systems typically include an array of processors linked to a common memory. Such parallel processing systems are well suited for solving problems involving matrix operations; however, difficulties arise in nonmatrix problems because each processor must be programmed so that they are coordinated to timely access stored information to solve various aspects of the problem at hand. Often the programming that is necessary is an extremely difficult and time-consuming task. Another problem in solving nonmatrix-type problems is that memory bottleneck often results.

As an example, the execution by parallel processing systems of rule-based systems is quite limited in speed. The limited speed of execution is typically due to the large number of rules in such systems, the small number of rules relevant to each change in the database, the large variation in the processing requirements of relevant rules, and the small number of changes made to the database between synchronization steps.

SUMMARY OF INVENTION

It is therefore an object of this invention to provide an improved processing system in which information is made available to a processor by an associated memory which informs the processor when the information is ready to be processed.

It is a further object of this invention to provide such a system in which the memory does not make information available until it is ready to be processed.

It is a further object of the invention to provide an expert system which efficiently coordinates a set of rules to be processed by the processor.

A still further object of this invention is to provide such a system which eliminates difficulties associated with coordinating the operation of parallel processors for solving a complex problem.

It is a further object of this invention to provide such a system which more efficiently utilizes processing time of the processor.

The invention results from the realization that a truly effective processing system, which eliminates the need for a processor to manage information to be processed in an associated memory and thereby frees the processor for performing other tasks, can be accomplished by a processor which processes information only when it is informed by an associated memory that information stored by that memory is available and ready to be processed.

This invention features a cell processor and memory-managed computer system using the same. The system includes a processor module for interacting with a memory module in which a plurality of groups of information are stored. Each group of information includes a data sector for storing a word, a vector sector for storing a vector word for linking that group to at least one other group, and a function sector. The function sector includes an operation field for storing an operation word that indicates the operation to be performed by the processor module on the data word, and a state field for storing a state word that represents a condition of that group for processing. The processor module includes processor means for receiving, when enabled by the memory module, a group of information designated by the memory module as ready for processing. The processing means is also used for selectively processing at least one of the words of the designated group. The processor module also includes an address generator means for identifying, based on the processing of the one or more words in the designated group, a group of information to be accessed and processed. A process manager means, responsive to the address generator means and the processing means, assembles an access request for the identified group and transmits the access request to the memory module to provide new information to the memory module or to request additional information from the memory module.

In one embodiment, the address generator means includes sector generator means for producing a sector address to the processor manager means to identify a requested sector of the identified group. The sector address is generated from a control signal transmitted to the sector generator means from the processor manager means and an operation word of the previously selected group of information, or from the control signal, the operation word, and a state word of the previously selected group of information. The processing means can include data generator means for providing data to the processor manager means to assemble the access request so that it includes information which is based on previously read data or based on a mathematical operation performed on the previously read data, as controlled by the processor manager means. Further, the processing means can include processor queue means connected to the memory module for receiving status signals from the memory module indicating which of the groups of information are ready to be processed.

In another embodiment, the system includes a processor module for generating memory access packets for interacting with a memory module having a plurality of cell packets containing information to be operated on by the processor. Each cell packet includes at least one data sector containing a data word, at least one vector sector containing a vector word for linking together other cell packets to be processed, and a function sector including an operation word for identifying a predetermined function to be performed by the processor and a state word for indicating the state of the cell packet for processing the processor. The processor module includes a memory access packet manager means for generating a plurality of control signals based on a previously selected cell packet. The manager means also assembles a memory access packet which includes a cell pack address and a cell sector address. The processor module also includes an address generator means for producing, as commanded by one of the control signals from the packet manager means, an address for the memory access packet based on a cell pack address in an address queue within the address generator means, or based on the combination of a previously read vector and the cell pack address in the address queue. Sector generator means produces a sector address for the memory access packet, based on another of the control signals from the packet manager means and an operation word of the previously selected cell packet, or based on the control signal, the operation word, and a state word of the previously selected cell packet. The packet manager means transmits the memory access packet to the memory module when assembly is completed to provide new information to the memory module or to request additional information from the memory module.

The system can include data generator means for providing data to the memory access packet manager means for assembling the memory access packet. That data can include information which is based on previously read data from a cell packet or based on a mathematical operation performed on the previously read data, as commanded by a control signal from the packet manager module. The data generator means may further include means for generating a comparison result signal based on previously read data and an additional value. The packet manager module selects between the provided data and the comparison result signal to selectively modify the memory access packet. The system may further include data type generator means for generating a data type by indexing one of a plurality of preselected data types based on the operation word and at least one data type word of the cell packet currently being processed by the processor module for classifying the data word to be processed.

A memory-managed computer system includes a plurality of processing units, each unit having a processor module and an associated local memory module. Each processor module includes processing means for receiving, when enabled by the local memory module, a group of information designated by the local memory module as ready for processing. The processing means also selectively processes at least one of the words of the designated group. An address generator means identifies, based on the processing of the one or more words in the designated group, a group of information to be accessed and processed. The processor module also includes processor manager means, responsive to the address generator means and the processor means, for assembling an access request for the identified group and for transmitting the access request to the memory module to provide new information to the selected memory module of the plurality of processing units, or to request additional information from the local memory module. Each local memory module includes memory means for storing a plurality of groups of information. Each group includes a data word, an operation word for indicating the operation to be performed by the processor on the data word, and a state word for representing the status of that group for processing by the associated local processor module. Selection means accepts an access request from the processor module from the plurality of processing units for an identified group and interprets the contents of the request. A state modification means determines, based on the information within the identified group and the memory means, when the identified group is ready to be processed by its associated local processor module. State modification means also updates the status of the identified group by selectively modifying the state word. It also selectively signals its associated local processor when the identified group is ready to be processed.

It is preferred that the processing means further include sector generator means for producing a sector address to the processor manager to identify a requested sector of the identified group. The sector address is generated from a control signal transmitted to the sector generator from the processor manager means and an operation word of the previously selected group of information, or from the control signal, the operation word, and a state word of the previously selected group of information. The processing means of the memory-managed computer system can further include data generator means for providing data to the processor manager means for assembling the access request so that it includes information which is based on previously read data or based on a mathematical operation performed on the previously read data, as controlled by the processor manager means. The processor module may also include processor queue means connected to its associated local module for receiving the enabling signals from the local memory module. The enabling signals include status signals and cell address signals for indicating to the processor manager means subsequent groups of information which are ready to be processed. Further, the selection means selectively writes at least a portion of the contents of the access request into the identified group in the memory means. Each group includes at least one vector word linking that group to at least one other group. That other group can be stored in that memory means or a memory module of an adjacent processing unit. As a part of the access request, the processor manager means assembles an address for the identified group and the memory module further includes means for combining the vector word with the address of the identified group for linking the processor to other groups. Each group is organized into sectors having unique sector addresses including a data sector for storing the data word, a function sector for storing the operation word and the state word, and at least one vector sector for storing each vector word. The processor manager means assembles, as a part of the access request, a vector packet including an address of the identified group, a sector address for that group, a data word, and a data type word indicating the associated classification of the data word.

In a further embodiment, a memory-managed computer system includes a plurality of processing units, each unit having a processor module and a local memory module. The system includes means for interconnecting each processor module of each unit to its associated local memory module and to a memory module of at least one other of the plurality of processing units for transferring processed information to be stored by one of the memory modules. The local memory modules of the units include means for organizing stored information into groups of information. The local memory modules of the unit only inform the associated processor module that a group of information is ready to processed. It also makes that group of information available only to the associated processor of that unit for processing.

DISCLOSURE OF PREFERRED EMBODIMENT

Other objects, features, and advantages will occur to those skilled in the art from the following description of a preferred embodiment and the accompanying drawings, in which:

FIG. 3 is a schematic block diagram of the processor module of FIG. 1;

FIG. 5 is a schematic block diagram illustrating cell packets of the memory module of FIG. 1 that are used for solving a sample rule;

This invention may be accomplished by a processor module which interacts with a memory module using memory access packets to access a plurality of groups of information stored in the memory module. The processor module processes information only when informed by the memory module that one of the groups of information is available and ready for processing. Each group is divided into sectors containing words to be operated on by the processor. In the preferred embodiment, each group is divided into three sectors: a data sector, a vector sector, and a function sector. The data sector contains one or more data words, and the vector sector includes at least one vector word for linking that group to at least one other group to be processed. The function sector includes at least an operation field and a state field which includes at least an operation word and a state word, respectively.

The processor module includes a processor for receiving a group of information designated by the memory module as ready for processing and for selectively processing at least one of the received words from the group. Based on the processed information, an address generator identifies another group of information to be accessed and processed. An access request for that identified group is assembled by a processor manager which is responsive to commands from the address generator and the processor. Once assembled, the access request is transmitted to the memory module by the processor manager to either provide new information to the memory module or to request additional information.

In the preferred construction, data provided to the memory access packet is based on previously read data from a cell packet or based on a mathematical operation performed on the previously read data. The processor also generates a comparison result which is based on previously read data and an another value for selectively controlling the memory access request manager. The processor further includes means for generating a data type by indexing one of a number of preselected data types which is based on the operation word and data type word of the cell packet currently being processed by the processor module. This data type is used by the processor for classifying the data to be processed.

Figure 1:
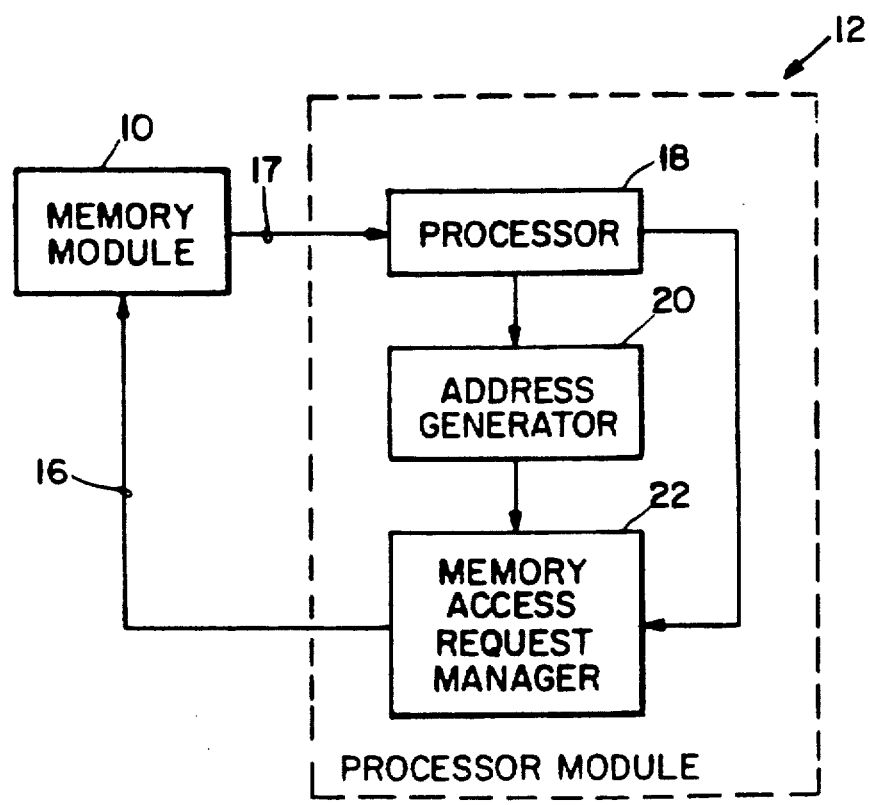
FIG. 1 is a schematic block diagram of a processor module, according to this invention, and a memory module.

Processor module 12 according to this invention, FIG. 1, includes a processor 18 which receives a group of information designated by memory module 10 as ready for processing. Memory module 10 is configured to store a plurality of groups of information, hereinafter referred to as cell packets. Each cell packet contains a plurality of sectors which store one or more words to be operated on by processor module 12. Based on the processing of one or more words, an address generator 20 identifies another cell packet to be accessed and processed. A memory access request manager 22 which is controlled by processor 18 responds to address generator 20 by assembling an access request for the identified cell packet. The memory access packet is then transmitted on line 16 to memory module 10 to provide new information to memory module 10 or to request additional information from memory module 10 on line 17 when made available by memory module 10.

In this construction, the memory access packet contains a single sector address such that only a single sector of the addressed cell packet is operated on at a time. Alternatively, the entire contents of an addressed cell packet may be addressed by the memory access packet and transferred on line 17 to processor module 12.

The cell packets stored in cell packet memory include at least one data sector, at least one vector sector, and a function sector as shown in Table I below. Preferably the data sector includes an X data sector and a Y data sector for storing data words. Vectors words stored in the vector sector of the cell packets define relationships among different cell packets.

TABLE I

| SECTORS OF A CELL PACKET | |
|---|---|
| X DATA | Y DATA |
| FUNCTION | |
| AVEC | BVEC |
| CVEC | DVEC |

Four vector sectors labelled A-D are shown. The cell packets may be considered as nodes and the vectors as connections or links among the nodes to establish a knowledge network. In other words, the vectors express the relation among the cell packets for a set of preselected rules. The function sector includes an operation field and a state field, and may include a data type field. The operation field is used for storing an operation word which indicates the operation to be performed by the processor on the data word. The state field is used for storing a state word which indicates the condition of that cell for processing. The data type field is used for storing a word that informs the processor as to how the information in the data sector is to be interpreted. Cell packets are discussed in greater detail below.

There are two different types of packets for accessing information in the memory module: vector packets and processor packets. Vector packets are used for writing a sector or setting the state of a selected cell packet. Processor packets are used in reading a sector or clearing the state of a selected cell packet.

A memory module must, for its operation, be able to determine the characteristics of data within each cell so that memory can control information requests by the processor. The relationships among the cell packets must also be established to enable control by the memory module. Relationships are established by the vectors of the cell packets; the vectors, in combination with the data and function words, implement a set of preselected rules which define a solution to a problem.

Figure 2:
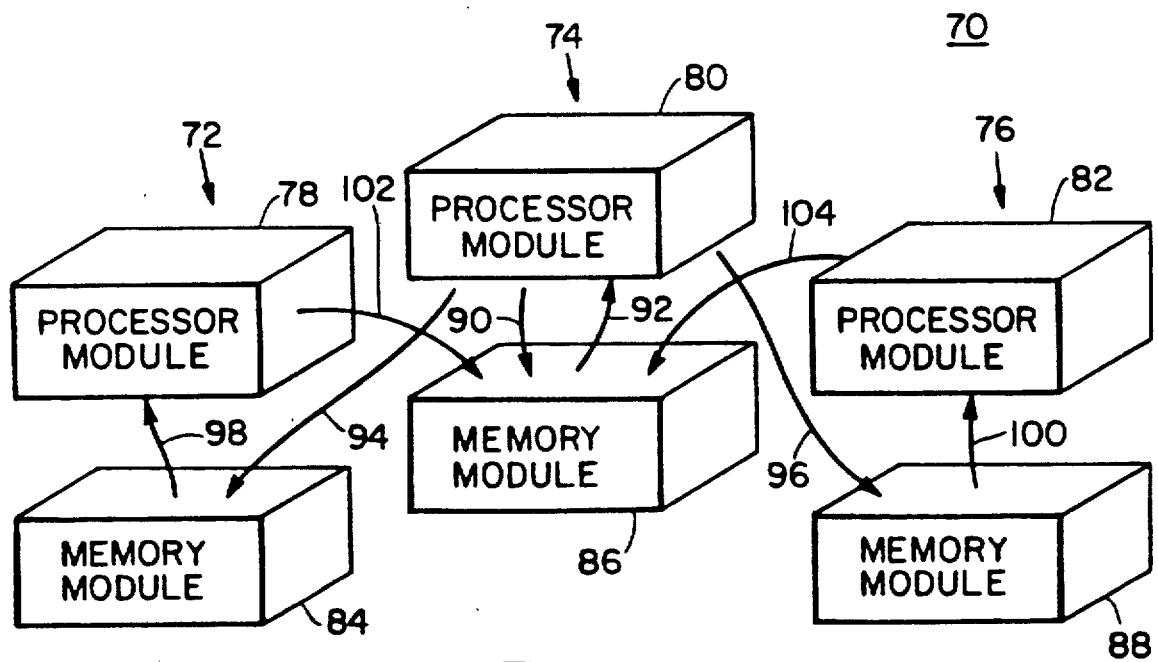
FIG. 2 is a schematic block diagram of processor and memory module pairs of a memory-managed computer system, according to this invention, illustrating the method for transferring data among the pairs.

Memory modules and processor modules according to this invention readily lend themselves to an integrated memory-managed computer system in which a number of pairs of memory modules and processor modules operate independently and yet rapidly for exchanging information. For example, memory-managed computer system 70, FIG. 2, includes three pairs 72, 74, and 76 of processor modules 78, 80, and 82, and memory modules 84, 86, and 88 according to this invention. Each memory module 84, 86, 88 contains memory which is configured to include a number of cell packets. The information which is stored in each cell packet may be read only by the processor module of its pair, hereinafter referred to as the local processor, as controlled by the memory module. Adjacent processors, however, may write information into cell packets of adjacent memories as well as cell packets of its local memory.

As an example, information that may be required to solve a problem may be distributed among the memory modules. Processor module 80 requesting information to solve a problem provides a memory access packet on line 90 to its local memory module 86. Memory module 86 analyzes the addressed cell packet and determines that additional information is required to answer the request. Accordingly, memory module 86 supplies selected cell information to local processor module 80 for processing. The selected cell information includes linking information which indicates where among additional cell packets, distributed among adjacent memory modules, the incomplete information can be derived. Based on the linking information, processor module 80 makes requests through lines 94 and 96 to adjacent memory modules 84, 88, respectively. These requests are operated on by those memory modules and information is transferred on lines 98, 100 to their local processor modules 78, 82, respectively. Information is then transferred on lines 102, 104 to memory module 86, to which the original request was made, for completing the information for processing. The completed information is then submitted on line 92 to processor module 80, thus completing the original request.

Memory modules 84 and 88 may similarly request information, by lines not shown, from other memory modules through their local processors. Information may also be requested from other cell packets from the same memory module. The advantage of processing information in this manner is that each processor is not burdened with locating information in memory. Instead, data is organized and managed by the memory units. Since the memory modules operate independently of the processor modules, the problems associated with coordinating multiple processors during parallel processing are eliminated.

A detailed block diagram of novel processor module 100 shown in FIG. 3 is a more detailed diagram of processor module 12 in FIG. 1. Generally, processor 18, FIG. 1, is implemented by processor controller 112, data type generator 164, processor queue 110, vector latch 162, vector adder 160, math unit 155, data latch 154, data comparator 156, data types latch 152, state latch 150, and operation latch 148. Address generator 20 of FIG. 1 is implemented by processor controller 112 and sector address generator 116. Finally, memory access request manager 22 of FIG. 1 is implemented by packet routing module 118 and process controller 112. Processor module 100 of FIG. 3 is initiated to process information when a status signal over line 108 and a cell address signal over line 109 are provided to it from its local memory 111. This information is provided to a processor queue 110 which then signals a processor controller 112 via queued status line 114 that the processor queue has now received information that a cell packet is ready to be processed. Processor controller 112 then commands a sector address generator 116 via line 117 to write a sector address to a packet routing module 118 via line 120, and then gates via line 122 the queued cell address from processor queue 110 to packet routing module 118 via line 124. Processor controller 112 then signals packet routing module 118 over line 126 to prepare a memory access packet. Depending on the operation to be performed, the memory access packet may consist of a processor packet, which includes a cell packet address and a sector address for essentially performing a read operation. Processor packets are provided only to local memory 111 over line 128. A memory access packet may also consist of a vector packet, which includes a cell packet address, a sector address, data, and data-type for performing the equivalent of a write operation, and may be directed to the local memory over line 130 or to adjacent memories 132, 134 over lines 136, 138, respectively. Receipt of the memory access packet by either the local memory or adjacent memories is acknowledged over lines 140, 142, and 144, respectively.

When a processor packet, which serves as a request for the queued cell packet, is received by local memory 111 and has been acknowledged, selected cell information is transmitted over line 106 to the processor module. That information includes the operation or function of the cell packet, which is latched into operation latch 148, and the state of the cell packet, which is latched into state latch 150. In this construction data type is also latched in data type latch 152. Upon the disabling of the acknowledge signal, on line 142, a selected acknowledged signal is sent from packet routing module 118, on line 158, to process controller 112 for signaling sector address generator 116 over line 117 to write a new sector address to packet routing module 118 over line 120. The new sector address is used for preparing a second memory access packet which uses the same gated cell address and the new sector address. This processor packet is then again provided to local memory on line 128. Data type, data, and operation are not latched on the disappearance of this second acknowledgment signal. The second processor packet is sent to change the state of the selected cell packet.

The next operation of the processor module depends entirely on the information that was latched in data type latch 152, state latch 150, and operation latch 148. If the operation requires information from the data sector, then a processor packet is assembled by packet routing module 118 and includes the sector address for that information. That packet is then sent to the local memory. Information addressed by the processor packet is transmitted over line 106 and latched in data latch 154 and data comparator 156. Data latched in data latch 145 is copied in math unit 155 and data comparator 156 via line 157. Once acknowledgment has been received from the local memory over line 140, packet routing module 118 signals process controller 112, over line 158, for enabling operation latch 148 to select data by gating information from data latch 154 or the result of a mathematical operation performed by a math unit 155, or the results of data comparator 156. Math unit 155 performs a number of mathematical operations. For example, it may add data from two different sectors of the same cell packet. Data comparator 156 compares data with a fixed value or with data values in different data sectors.

If the operation requires a link to be performed, that is, if information stored in another cell packet must be accessed or the data result must be written into another cell packet, then the operation latch 148 signals sector address generator 116, on line 149, to place the address of the appropriate vector sector on line 120 to packet routing module 118 for assembling another memory access packet. When that packet is transmitted, on line 128, to local memory 111, information at that vector sector is latched by vector latch 162. Upon acknowledgment by local memory 111, the next operation for process controller 112 is to command processor packet routing module 118 to assemble a vector packet. The cell address of the vector packet is controlled by processor controller 112 by gating the result of vector adder 160 via line 122. The new cell address is determined by adding the information latched in vector latch 162 and the address of the current cell addressed in processor queue 110. Process controller 112 also controls gating of information from math unit 155 or data latch 154 to packet routing module 118 by signaling operation latch 148 via line 126 to generate a gating signal on line 149. A data type is generated by a data type generator 164 and is sent to packet routing module 118 over line 166. The state of the data type is controlled by the information latched in operation latch 148 and data type latch 152. The assembled vector packet is then routed to the appropriate local or adjacent memory via lines 130, 136, or 138 and acknowledged by that memory via lines 140, 142, or 144. Once acknowledgment has been received by packet routing module 118, a signal is sent to processor controller 112 for gating the next cell address in processor queue 110 to be operated on.

Figure 4:
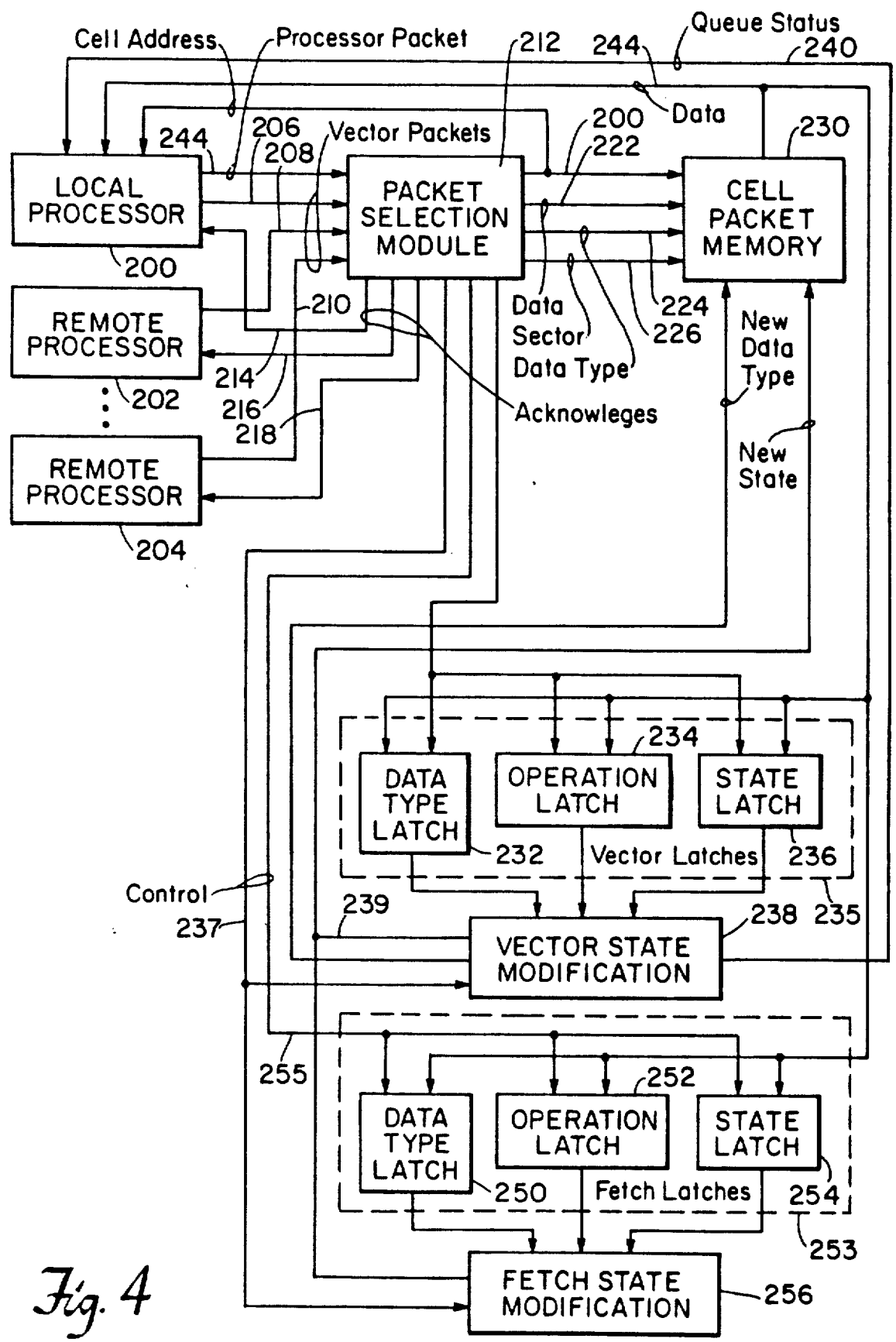
FIG. 4 is a schematic block diagram of the memory module of FIG. 1.

A vector packet may be sent from one of several processors 200, 202, and 204 over lines 206, 208, and 210, respectively, to a single memory module as shown in FIG. 4. A packet selection module 212 is used for selecting a vector packet from one of the processors. Acknowledgment from selection module 212 is sent to the selected processor via lines 214, 216, or 218. The cell address, sector address, data type, and data value of the vector packet is transmitted by packet selection module 212 to cell packet memory 230 over lines 220, 222, 224, and 226, respectively. Data and data type are then written into the selected cell and sector addressed by the vector packet. Thereafter, packet selection module 212 controls vector latches 235 for latching data type, operation, and state of the vector packet into data type latch 232, operation latch 234, and state latch 236, respectively, via line 244. Packet selection module 212 then controls vector state modification logic module 238 via line 237 to generate a new state based on the information latched by latches 232, 234, and 236. The new vector state is then written into the cell packet memory of the previously selected cell address via line 239. That write operation concludes the vector packet operation, and packet selection module 212 removes the acknowledgment to the selected processor. If the vector state modification logic module 238 causes a transition from a nonqueued state to a queued state, a queue status signal is generated on line 240 to the local processor 200, causing it to latch the current cell packet address on line 220 which causes that cell address to be queued in processor queue 110, FIG. 3.

If packet selection module 212 selects a processor packet sent from a local processor over line 244, the cell packet address and the sector address of the processor packet are transmitted to cell packet memory 230 from packet selection module 212 over lines 220 and 226. The information contained in that address is transmitted to local processor 200 over line 244 when packet selection module 212 removes its acknowledge signal. If the processor packet addresses the function sector, then packet selection module 212 controls fetch latches 253 via line 255 to latch the previously read data type, operation, and state into data type latch 250, operation latch 252, and state latch 254, respectively. If the processor packet addresses the state sector, then the fetch state modification logic 256 is controlled by packet selection module 212 via line 237 to generate a new state which is then written into the function section of the currently addressed cell packet. Once the new state has been written into the addressed cell packet the processor packet operation is complete.

The operation of the present invention is further illustrated by a sample rule structure shown in FIG. 5. The problem to be solved is to determine whether cargo can be loaded onto a truck. Before that inquiry can be answered, the amount of available space on the truck must be determined. The process for determining the amount of available space for the cargo is accomplished by comparing the cargo size with the available truck space. Upon determining that the available space is greater than the cargo size, the truck is loaded and the status of the cargo is designated as loaded on the truck. The available truck space is updated by subtracting the cargo size from the available truck space.

Initially, the contents of the cell packets are defined by the rules used in the problem. That is, the data and function words in each cell packet and the relationships among the cell packets expressed by vector words are provided to implement selected rules.

Before solving the problem, the cell packets are initialized by removing all of the request and queue flags located in the state sectors of the cell packets. In this example, nine cell packets labelled 0 thru 8 are shown in FIG. 5. For convenience, a legend designating the sectors of the cell packet which is equivalent to Table I is also included. Functions such as requests and triggers made by a host computer are access packets not shown as a part of the cell packet. The request function made by the host processor simply requests information from the cell packet. No data is sent by the processor to the memory cell packet. A trigger function is used to request processing information from the cell packet. In other words, request and trigger packets are both used to update the state of the cell packet. The request packet is used for setting the state of the cell packet to "requested and queued". The trigger packet only sets the packet to a "queued" state.

For the present example, the host computer operates as a remote processor and a remote memory. An initial request is made by the processor for requesting the cargo status. In other words, a memory access packet is generated to request the cell packet having an address of "2" for obtaining cargo status information located in the X data sector. This request consists of a vector packet, which only includes the addresses of a cell packet and request "sector", which is part of the state field and is a single bit in this construction that is recognized by the memory module for indicating that a request instruction has been made by the processor module.

As shown in FIG. 5, the X data is presently unknown and is so indicated by a question mark. The currently addressed cell packet also includes a operation "VAR" in the function sector and a "+1" in the C vector sector. The operation "VAR" represents a single value variable operation as illustrated in Table II below. Other operations that will be discussed below are also listed in Table II.

acknowledged signal is generated by packet selection module 212 informing the processor that the remote vector packet has been received, block 306. In the preferred embodiment, remote processors are given priority over its local processor since the local processor typically requires more access to the memory and could therefore lock out adjacent processors. Packet selection module 212 also controls vector latches 232, 234, and 236 to latch data type, operation and state words of the addressed cell packet, block 310. Packet selection 212 module then controls the vector state modification logic 238 to generate a new state and data types. Control is then asserted by memory packet selection module 212 to write a new state and data types into the addressed cell packet, block 312.

Figure 7:
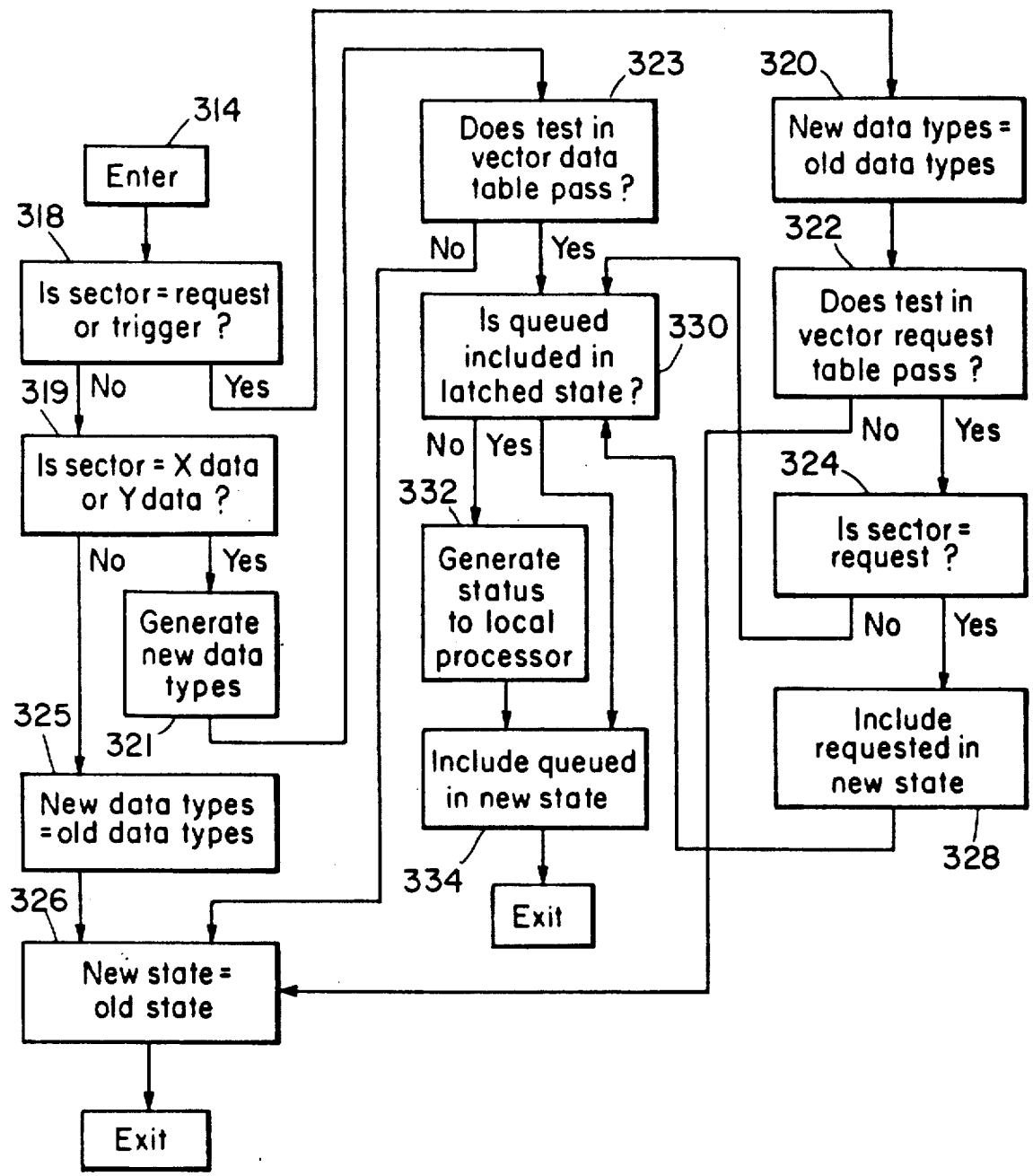
FIG. 7 is a flow diagram illustrating the operation of the memory vector state modification shown in FIG. 4.

A flowchart for vector state modification logic module 238 is illustrated in FIG. 7. Once the data type, operation, and state words are latched, the generate vector state modification control, block 312, determines if the vector packet is addressing a sector, block 318. In essence, it is not a request or trigger function. If a sector is addressed, then packet selection module 212 controls the cell packet memory 230 to write data into the addressed sector of the cell packet, blocks 319 and 321, and then tests data according to the vector state modifi-

TABLE II

| | INSTRUCTION DESCRIPTION TABLE |
|---|---|
| OPERATION | DESCRIPTION |
| VAR | SINGLE VALUE VARIABLE |
| SET | SETS THE VALUE OF A VARIABLE (EXCEPT MVAR) |
| DAT | SENDS X DATA |
| REQ | SENDS REQUEST |
| SWP | SENDS Y DATA |
| ADD | ADDS X DATA TO Y DATA |
| SUB | SUBTRACTS Y DATA FROM X DATA |
| MUL | MULTIPLIES X DATA BY Y DATA |
| DIV | DIVIDES X DATA BY Y DATA |
| EQL | TEST FOR X DATA EQUAL TO Y DATA |
| GRT | TEST FOR X DATA GREATER THAN Y DATA |
| LST | TEST FOR X DATA LESS THAN Y DATA |
| MSET | SETS A VALUE INTO A MULTIVALUE VARIABLE |
| MVAR | MULTIVALUE VARIABLE |
| SFUN | SENDS A SERVICE REQUEST FOR A SYSTEM FUNCTION |
| DFUN | SENDS A SERVICE REQUEST FOR A DISPLAY FUNCTION |
| FVAR | FRAME VARIABLE |
| SVAR | SLOT VARIABLE |
| RVAR | RECORD VARIABLE |
| DVAR | DATABASE VARIABLE |
| MEM | TESTS FOR MEMBERSHIP OF X DATA IN A MULTIVALUE VARIABLE |
| NMEM | TESTS FOR NO MEMBERSHIP OF X DATA IN A MULTIVALUE VARIABLE |
| SYN | GENERATES A TRIGGER WHEN IT SENDS X OR Y DATA |
| POW | RAISES X DATA TO THE Y DATA POWER |
| ••• | N/A |
| NEQL | TESTS FOR X DATA NOT EQUAL TO Y DATA |
| NGRT | TESTS FOR X DATA NOT GREATER THAN Y DATA |
| NLST | TESTS FOR X DATA NOT LESS THAN Y DATA |
| ••• | N/A |
| ••• | N/A |
| ••• | N/A |
| NOP | NO OPERATION |

The "+1" in C vector sector is used to link the processor to the next cell to be processed and is discussed below.

Figure 6:
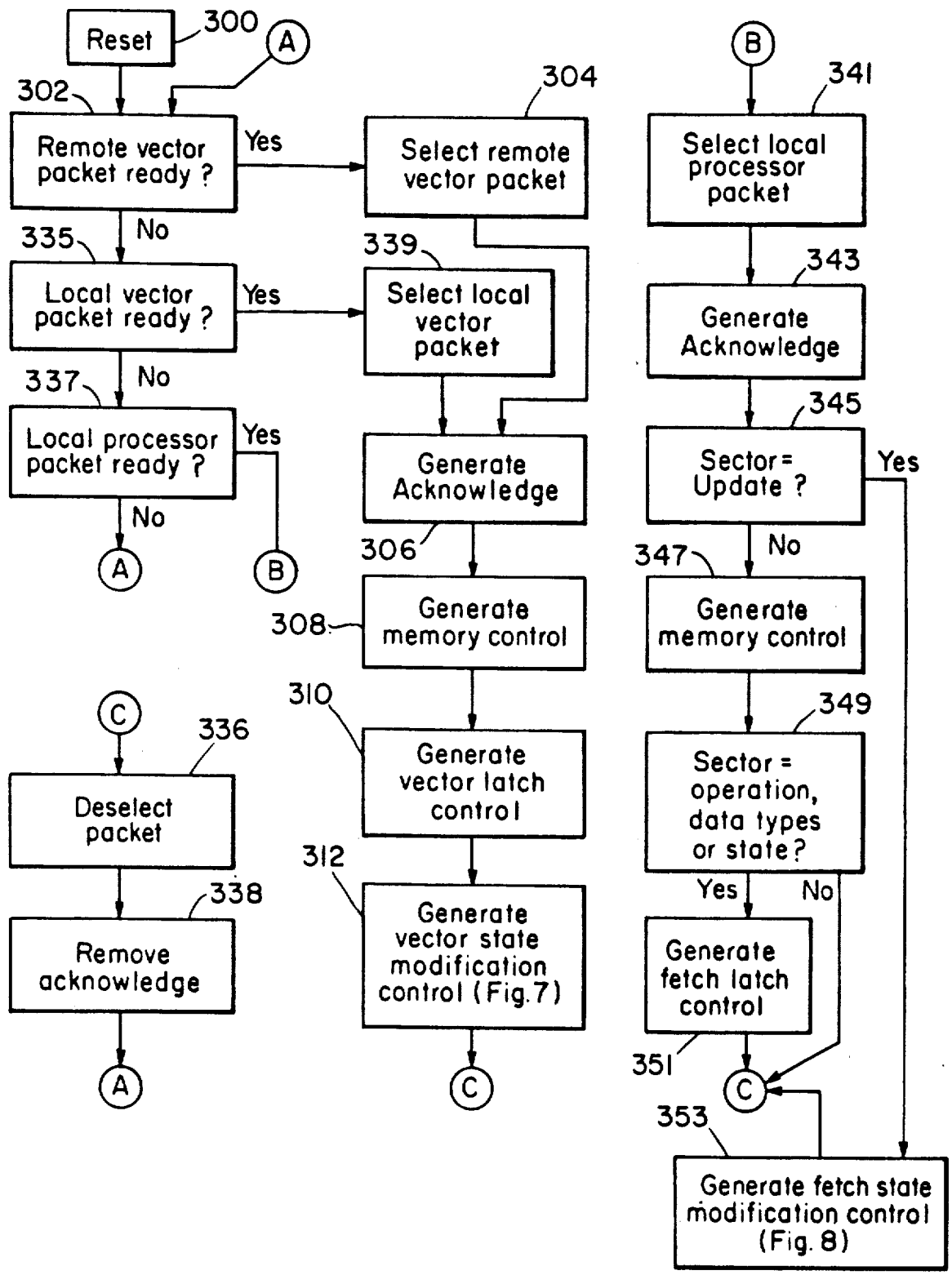
FIG. 6 is a flow diagram illustrating the operation of selecting memory access packets from processors of FIG. 2.

Referring to the memory packet selection flowchart shown in FIG. 6, the cell packets are initially reset, block 300, and a test is performed for determining whether a remote packet was selected by packet selection module 212, FIG. 4. Since the computer in this example operates as a remote processor and memory and no other memory access packets have been sent, the remote vector packet is selected, block 304, and an.

cation data table, block 323 and Table III below. If no data is to be written into the addressed sector, the new data types are set to equal the old data types and the new state is set to equal the old state, blocks 325, 326. The vector packet is then deselected from the local processor's queue and the acknowledge is removed, blocks 336 and 338, FIG. 6.

Since the vector packet is initially a request in this example, no memory control signals are generated by packet selection module 212 for writing data into a sector, and the new data types will equal the old data types, blocks 318 and 320. The request changes the state of the cell packet to a queued and requested state. Trigger vector packets do not transfer data into a cell packet, rather they initiate operations which update the status of the cell packet for processing. The state is updated by packet selection module 212 which generates memory control signals to read the operation, data types, and status of the address cell packet.

Referring to the vector request table, Table IV, a test is conducted for determining the new state, block 322. If the test fails, then the new state equals the old state, blocks 324 and 326, and the vector state modification logic waits for a ready control signal from packet selection module 212. Since the vector packet selector is a request, the test passes and vector state modification logic 238 includes a "requested" status in the new state, block 328.

TABLE III

VECTOR STATE MODIFICATION DATA TABLE

| OPERATION | TYPE | OPERATION | TYPE |
|---|---|---|---|
| VAR | 2 | FVAR | 2 |
| SET | 3 | SVAR | 7 |
| DAT | 1 | RVAR | 2 |
| REQ | 1 | DVAR | 2 |
| SWP | 1 | MEM | 5 |
| ADD | 4 | NMEM | 5 |
| SUB | 4 | SYN | 8 |
| MUL | 4 | POW | 4 |
| DIV | 4 | *** | 0 |
| EQL | 5 | NEQL | 5 |
| GRT | 5 | NGRT | 5 |
| LST | 5 | NLST | 5 |
| MSET | 3 | *** | 0 |
| MVAR | 2 | *** | 0 |
| SFUN | 6 | *** | 0 |
| DFUN | 6 | NOP | 6 |

TYPE DESCRIPTION

| | |
|---|---|
| 0 | INVALID. |
| 1 | ALWAYS PASS. |
| 2 | IF PREVIOUS X DATA TYPE WAS NOT UNKNOWN AND NEW X DATA TYPE IS UNKNOWN, THEN PASS; ELSE FAIL. |
| 3 | IF STATE INCLUDES REQUESTED AND NEW X DATA TYPE IS NOT UNKNOWN, THEN PASS; ELSE FAIL. |
| 4 | IF BOTH NEW X DATA TYPE AND NEW Y DATA TYPE ARE NOT UNKNOWN OR DATA TYPE IS UNKNOWN, THEN PASS; ELSE FAIL. |
| 5 | IF STATE INCLUDES REQUESTED AND NEW X DATA TYPE IS NOT UNKNOWN AND NEW Y DATA TYPE IS NOT UNKNOWN, THEN PASS; ELSE FAIL. |
| 6 | ALWAYS FAIL. |
| 7 | IF NEW Y DATA TYPE IS NOT UNKNOWN, THEN PASS; ELSE FAIL. |
| 8 | IF SECTOR IS X DATA, THEN PASS; ELSE FAIL. |

TABLE IV

VECTOR STATE REQUEST DATA TABLE

| OPERATION | TYPE | OPERATION | TYPE |
|---|---|---|---|
| VAR | 2 | FVAR | 2 |
| SET | 1 | SVAR | 2 |
| DAT | 1 | RVAR | 2 |
| REQ | 1 | DVAR | 2 |
| SWP | 1 | MEM | 1 |
| ADD | 1 | NMEM | 1 |
| SUB | 1 | SYN | 1 |
| MUL | 1 | POW | 1 |
| DIV | 1 | *** | 0 |
| EQL | 1 | NEQL | 1 |
| GRT | 1 | NGRT | 1 |
| LST | 1 | NLST | 1 |
| MSET | 1 | *** | 0 |
| MVAR | 2 | *** | 0 |
| SFUN | 1 | *** | 0 |
| DFUN | 1 | NOP | 3 |

TABLE IV-continued

VECTOR STATE REQUEST DATA TABLE

| TYPE | DESCRIPTION |
|---|---|
| 0 | INVALID. |
| 1 | IF STATE DOES NOT INCLUDE REQUESTED, THEN PASS; ELSE FAIL. |
| 2 | IF STATE DOES NOT INCLUDE REQUESTED AND X DATA TYPE IS UNKNOWN, THEN PASS; ELSE FAIL. |
| 3 | ALWAYS FAIL. |

The state is updated by packet selection module 212 which generates memory control signals to read the operation, data types, and state of the address cell packet. After a new state has been written into the addressed cell packet, a determination is made by the vector state modification logic module 238 to see if a queued state is included in the latched state, block 330. Since the queued state was initially cleared, vector state modification logic 238 signals the local processor's queue 110, FIG. 3, that the address is a newly queued cell packet. The status signal on line 143, FIG. 3, is enabled to the local processor which causes the local processor to put the address of this current cell packet into its processor queue 110, block 332, and includes a queued state in the new state written into the addressed cell packet, block 334. Thus the new state written into the current cell packets is "requested and queued." At this point, the vector packet operation is completed, and cell 2 is both requested and queued. The vector packet is then deselected from the local processor's queue and the acknowledge is removed, blocks 336 and 338, FIG. 6.

If the memory access packet was originated by the local processor rather than a remote processor as in the present example, then the packet selection module 212 determines if the packet is a vector packet or a processor packet, blocks 335 and 337. An acknowledge signal is sent to the local processor when that packet is selected, blocks 339 and 306. This packet is then processed in the same manner as described above. If, however, the packet is a processor packet and is not used to update a sector, the packet selection module controls the cell memory to read the sector of the addressed cell packet, blocks 341, 343, 345, and 347. If the sector addressed is an operation, data type, or state sector, the packet selection module then controls the fetch latches 253, FIG. 4, to latch the operation, data type, and state from the addressed cell packet, blocks 349 and 351.

When the processor packet sector is used to update a sector, the processor selection module controls the fetch state modification module 256, FIG. 4, to generate a new state and controls the memory to write the new state into the addressed cell packet, block 353, FIG. 6. Fetch state modification module 256 then performs a test according to the fetch state modification table, Table V below.

TABLE V
FETCH STATE MODIFICATION TABLE

| OPERATION | TYPE | OPERATION | TYPE |
|---|---|---|---|
| VAR | 2 | FVAR | 2 |
| SET | 2 | SVAR | 2 |
| DAT | 1 | RVAR | 2 |
| REQ | 1 | DVAR | 2 |
| SWP | 1 | MEM | 3 |
| ADD | 3 | NMEM | 3 |
| SUB | 3 | SYN | 1 |
| MUL | 3 | POW | 3 |
| DIV | 3 | *** | 0 |
| EQL | 3 | NEQL | 3 |
| GRT | 3 | NGRT | 3 |
| LST | 3 | NLST | 3 |
| MSET | 2 | *** | 0 |
| MVAR | 2 | *** | 0 |
| SFUN | 2 | *** | 0 |
| DFUN | 2 | NOP | 1 |

| TYPE | DESCRIPTION |
|---|---|
| 0 | INVALID. |
| 1 | ALWAYS PASS. |
| 2 | IF OLD STATE INCLUDES REQUESTED AND OLD X DATA TYPE IS NOT UNKNOWN, THEN PASS; ELSE FAIL. |
| 3 | IF OLD STATE INCLUDES REQUESTED AND OLD X DATA TYPE IS NOT UNKNOWN AND OLD Y DATA TYPE IS NOT UNKNOWN, THEN PASS; ELSE FAIL. |

Figure 8:
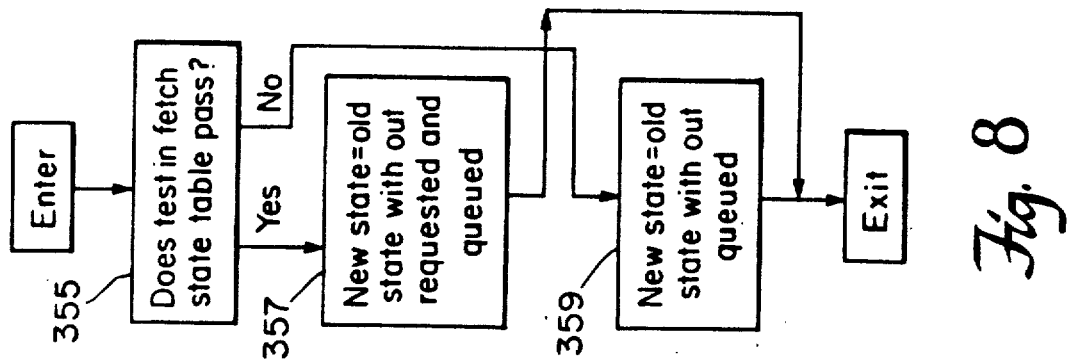
FIG. 8 is a flow diagram illustrating the operation of memory fetch state modification shown in FIG. 4.

If the test passes, fetch state modification module 256 generates a new state by removing the requested and queued status from the old state, blocks 355 and 357, FIG. 8. Otherwise, fetch state modification module 256 generates a new state by removing the queued status from the old state, block 359.

Figure 9:
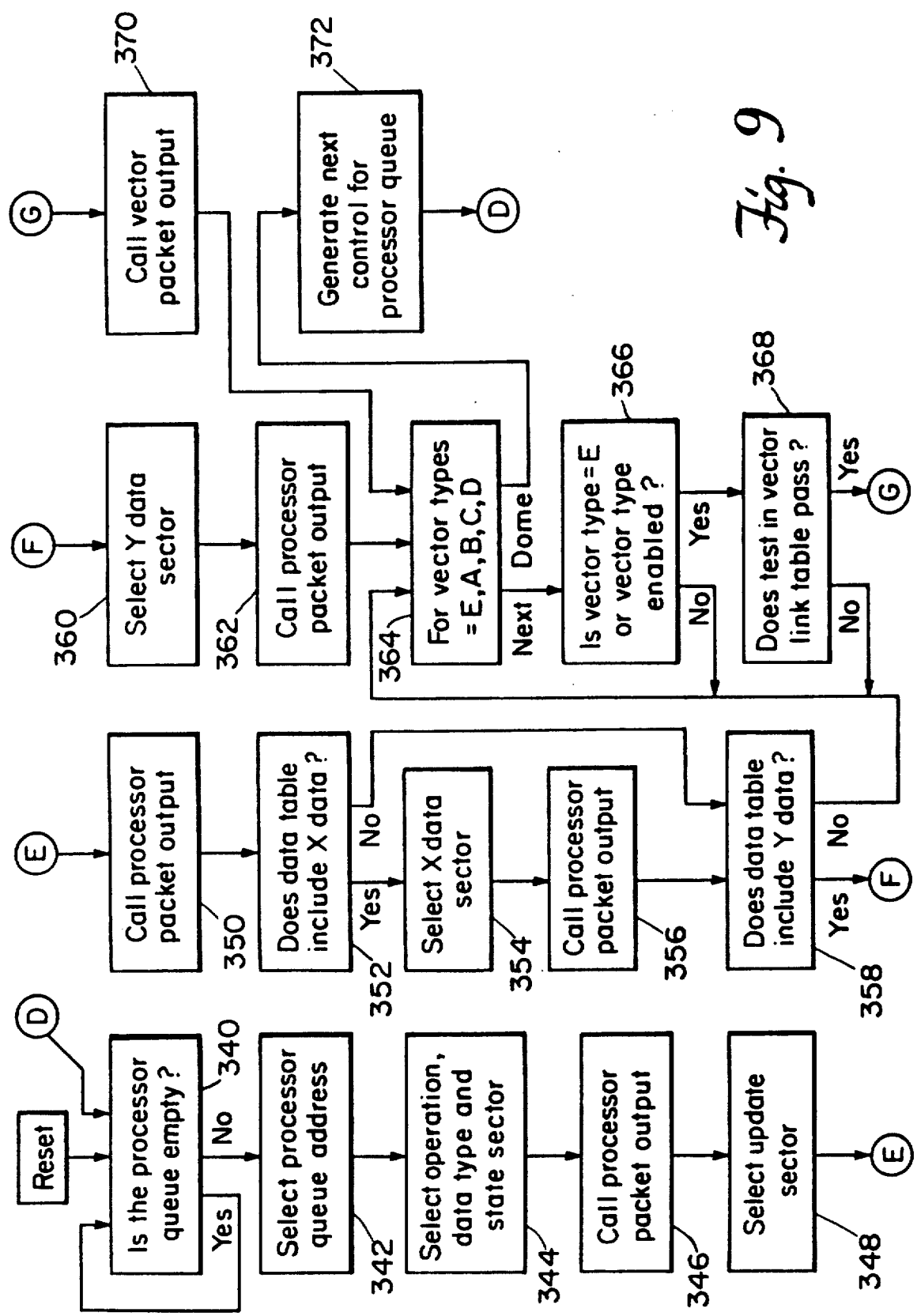

At this point in the above example, the requesting computer has performed the operation identified in the vector packet and, in doing so, a new cell packet address is placed into the local processor's queue. Now, the local processor which has been waiting to be queued contains an address and changes its status status to not empty, block 340, FIG. 9. This status initializes process controller 112, FIG. 3 to begin a memory access packet production cycle. Process controller 112 selects processor queue 110 as the source of the cell packet address to process, block 342, FIG. 9. Process controller 112 then controls packet routing module 118 to select the operation, data types, and state sector from latches 148, 150, and 152, respectively, for assembling a processor packet, block 344. Once the processor packet has been assembled, packet selection module 118 routes the packet to its local memory unit 111, block 346. This begins a processor packet output cycle. Processor controller 112, FIG. 3, controls the packet routing module 118 to generate and send a processor packet, block 376, FIG. 10. At this point, packet selection module 118 and process controller 112 wait for the selected acknowledge to be asserted and removed by the local memory unit, blocks 378 and 380. This ends the cycle for packet routing module 118. Processor controller 112 now generates the latch control signals, blocks 382, 383, for the data type, operation, state latches, block 348, FIG. 9.

Process controller 112 then performs a test to check the previously latched operation to determine if X data or Y data value is required and known. That determination is made in accordance with Tables VI and VII below. If an X data value is needed, the process controller 112 controls sector generator 116 to select the X data sector of cell packet.

TABLE VI
PROCESSOR DATA TABLE

| OPERATION | TYPE | OPERATION | TYPE |
|---|---|---|---|
| VAR | 1 | FVAR | 1 |
| SET | 1 | SVAR | 1 |
| DAT | 1 | RVAR | 1 |
| REQ | 3 | DVAR | 1 |
| SWP | 1 | MEM | 3 |
| ADD | 2 | NMEM | 3 |
| SUB | 2 | SYN | 1 |
| MUL | 2 | POW | 2 |
| DIV | 2 | *** | 0 |
| EQL | 3 | NEQL | 3 |
| GRT | 3 | NGRT | 3 |
| LST | 3 | NLST | 3 |
| MSET | 1 | *** | 0 |
| MVAR | 1 | *** | 0 |
| SFUN | 1 | *** | 0 |
| DFUN | 1 | NOP | 3 |

| TYPE | DESCRIPTION |
|---|---|
| 0 | INVALID. |
| 1 | USES X DATA. |
| 2 | USES X DATA AND Y DATA. |
| 3 | DOES NOT USE DATA. |

TABLE VII
PROCESSOR DATA TYPE TABLE

| OPERATION | TYPE | OPERATION | TYPE |
|---|---|---|---|
| VAR | 1 | FVAR | 1 |
| SET | 1 | SVAR | 4 |
| DAT | 1 | RVAR | 1 |
| REQ | 3 | DVAR | 1 |
| SWP | 1 | MEM | 3 |
| ADD | 2 | NMEM | 3 |
| SUB | 2 | SYN | 1 |
| MUL | 2 | POW | 2 |
| DIV | 2 | *** | 0 |
| EQL | 3 | NEQL | 3 |
| GRT | 3 | NGRT | 3 |
| LST | 3 | NLST | 3 |
| MSET | 1 | *** | 0 |
| MVAR | 1 | *** | 0 |
| SFUN | 1 | *** | 0 |
| DFUN | 1 | NOP | 3 |

| TYPE | DESCRIPTION |
|---|---|
| 0 | INVALID. |
| 1 | OUTPUT DATA TYPE IS X DATA TYPE. |
| 2 | IF ANY DATA TYPE IS UNKNOWN, THEN OUTPUT DATA TYPE IS UNKNOWN; ELSE IF ANY DATA TYPE IS PASS, THEN OUTPUT DATA TYPE IS PASS; ELSE IF ANY DATA TYPE IS FAIL, THEN OUTPUT |

TABLE VII-continued
PROCESSOR DATA TYPE TABLE

|   | |
|---|---|
|   | DATA TYPE IS FAIL; ELSE OUTPUT DATA TYPE IS VALUE. |
| 3 | OUTPUT DATA TYPE IS UNKNOWN. |
| 4 | IF Y DATA TYPE IS UNKNOWN, THEN OUTPUT DATA TYPE IS UNKNOWN; ELSE OUTPUT DATA TYPE IS X DATA TYPE. |

If it needs Y data, process controller 112 generates control signals to sector generator 116 to select the Y data sector of the cell packet, blocks 352, 354, 356, 358, 360. The process controller then performs a processor packet output cycle described above. At the completion of the output cycle, processor controller 112 then tests for five vectors, E, A, B, C, and D, block 364. If a vector type has been enabled, block 366, process controller 112 performs a test according to a vector link table, Table VIII below, block 368. The process controller then performs a vector packet output cycle, block 370.

Figure 10:
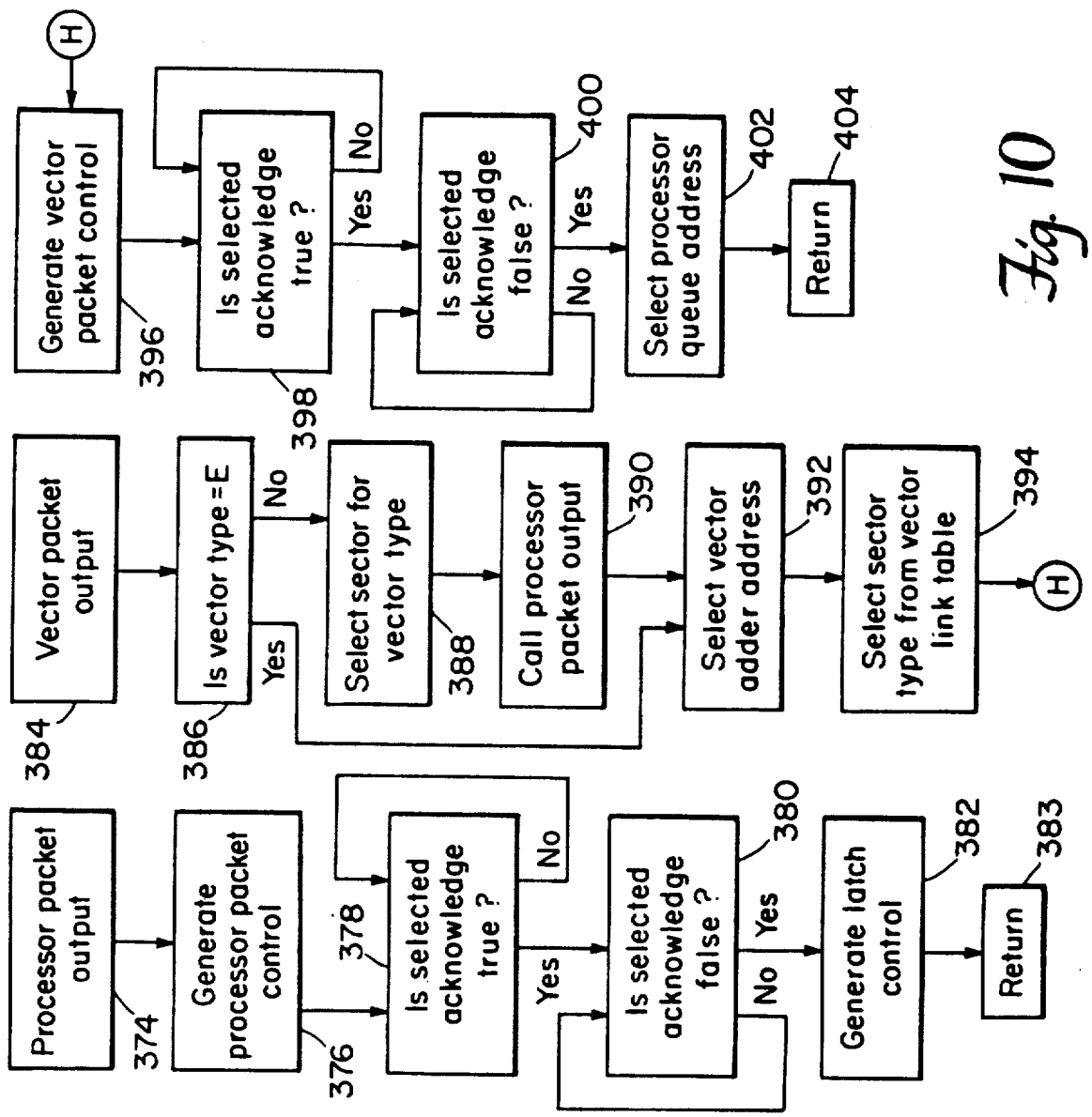
FIGS. 9 and 10 are flow diagrams illustrating the operation of the processor controller shown in FIG. 3.

Processor controller 112 tests for the special vector E which is used to request service from the host computer, block 386, FIG. 10. If service is requested from the host computer, then processor controller 112 selects processor queue 110 as the source of the cell packet address, block 392. Otherwise, the processor controller first controls sector generator 116 to select the current vector type, and perform a processor packet output cycle to read the current vector sector from the addressed cell packet, blocks 388 and 390, before selecting the vector adder 160 as the source of the cell packet address, block 392. Processor controller 112 then controls sector generator 116 to select the appropriate sector for the current vector type, state, and operation, block 394. Control signals are also sent to packet routing module 118 to generate a vector packet and send it to the appropriate memory module. Once the packet is sent, processor controller waits for an acknowledge to be asserted indicating that the memory module is working on the vector packet, block 398.

TABLE VIII
VECTOR LINK TABLE

| OPERATION | TYPE A | TYPE B | TYPE C | TYPE D | TYPE E |
|---|---|---|---|---|---|
| VAR | 9 | 9 | 5 | 5 | 12 |
| SET | 22 | 1 | 5 | 1 | 1 |
| DAT | 3 | 3 | 3 | 3 | 1 |
| REQ | 2 | 2 | 2 | 2 | 1 |
| SWP | 4 | 4 | 4 | 4 | 1 |
| ADD | 7 | 8 | 5 | 6 | 1 |
| SUB | 7 | 8 | 5 | 6 | 1 |
| MUL | 7 | 8 | 5 | 6 | 1 |
| DIV | 1 | 1 | 5 | 6 | 21 |
| EQL | 10 | 11 | 5 | 6 | 1 |
| GRT | 10 | 11 | 5 | 6 | 1 |
| LST | 10 | 11 | 5 | 6 | 1 |
| MSET | 1 | 1 | 5 | 1 | 23 |
| MVAR | 9 | 9 | 5 | 5 | 20 |
| SFUN | 22 | 1 | 5 | 1 | 13 |
| DFUN | 22 | 1 | 5 | 1 | 13 |
| FVAR | 3 | 3 | 1 | 1 | 1 |
| SVAR | 14 | 1 | 15 | 6 | 1 |
| RVAR | 9 | 9 | 5 | 1 | 1 |
| DVAR | 16 | 16 | 1 | 1 | 24 |
| MEM | 1 | 1 | 5 | 6 | 21 |
| NMEM | 1 | 1 | 5 | 6 | 21 |
| SYN | 17 | 18 | 19 | 18 | 1 |
| POW | 1 | 1 | 5 | 6 | 21 |
| *** | 0 | 0 | 0 | 0 | 0 |
| NEQL | 11 | 10 | 5 |   | 1 |
| NGRT | 11 | 10 | 5 |   | 1 |
| NLST | 11 | 10 | 5 | 6 | 1 |
| *** | 0 | 0 | 0 | 0 | 0 |
| *** | 0 | 0 | 0 | 0 | 0 |
| *** | 0 | 0 | 0 | 0 | 0 |
| NOP | 1 | 1 | 1 | 1 | 1 |

| TYPE | DESCRIPTION |
|---|---|
| 0 | INVALID. |
| 1 | ALWAYS FAIL. |
| 2 | ALWAYS PASS (SECTOR=REQUEST). |
| 3 | ALWAYS PASS (SECTOR=X DATA). |
| 4 | ALWAYS PASS (SECTOR=Y DATA). |
| 5 | IF STATE INCLUDES REQUESTED AND X DATA TYPE IS UNKNOWN, THEN PASS (SECTOR=REQUEST); ELSE FAIL. |
| 6 | IF STATE INCLUDES REQUESTED AND Y DATA TYPE IS UNKNOWN, THEN PASS (SECTOR=REQUEST); ELSE FAIL. |
| 7 | IF STATE DOES NOT INCLUDE REQUESTED OR STATE INCLUDES REQUESTED AND BOTH X DATA TYPE AND Y DATA TYPE ARE NOT UNKNOWN, THEN PASS (SECTOR=X DATA); ELSE FAIL. |
| 8 | IF STATE DOES NOT INCLUDE REQUESTED OR STATE INCLUDES REQUESTED AND BOTH X DATA TYPE AND Y DATA TYPE ARE NOT UNKNOWN, THEN PASS (SECTOR=Y DATA); ELSE FAIL. |
| 9 | IF STATE DOES NOT INCLUDE REQUESTED OR STATE INCLUDES REQUESTED AND X DATA TYPE IS NOT UNKNOWN, THEN PASS; (SECTOR=X DATA) ELSE FAIL. |

TABLE VIII-continued
VECTOR LINK TABLE

| | |
|---|---|
| 10 | IF X DATA TYPE IS NOT UNKNOWN AND Y DATA TYPE IS NOT UNKNOWN AND COMPARATOR RESULT IS TRUE THEN: IF STATE INCLUDES REQUESTED, THEN PASS (SECTOR=REQUEST); ELSE PASS (SECTOR=TRIGGER); ELSE FAIL. |
| 11 | IF X DATA TYPE IS NOT UNKNOWN AND Y DATA TYPE IS NOT UNKNOWN AND COMPARATOR RESULT IS FALSE THEN: IF STATE INCLUDES REQUESTED, THEN PASS (SECTOR=REQUEST); ELSE PASS (SECTOR=TRIGGER); ELSE FAIL. |
| 12 | IF STATE INCLUDES REQUESTED AND X DATA TYPE IS UNKNOWN AND VECTOR C IS NOT ENABLED AND VECTOR D IS NOT ENABLED, THEN PASS (SECTOR=SERVICE); ELSE FAIL. |
| 13 | IF STATE INCLUDES REQUESTED AND X DATA TYPE IS NOT UNKNOWN, THEN PASS (SECTOR=SERVICE); ELSE FAIL. |
| 14 | IF BOTH STATE DOES NOT INCLUDE REQUESTED AND Y DATA TYPE IS NOT UNKNOWN OR STATE INCLUDES REQUESTED AND X DATA TYPE IS NOT UNKNOWN AND Y DATA TYPE IS NOT UNKNOWN, THEN PASS (SECTOR=X DATA); ELSE FAIL. |
| 15 | IF STATE INCLUDES REQUESTED AND X DATA TYPE IS UNKNOWN AND Y DATA TYPE IS NOT UNKNOWN, THEN PASS (SECTOR=REQUEST); ELSE FAIL. |
| 16 | IF STATE DOES NOT INCLUDE REQUESTED AND X DATA TYPE IS UNKNOWN, THEN PASS (SECTOR=X DATA); ELSE FAIL. |
| 17 | IF COMPARATOR RESULT IS FALSE, THEN PASS (SECTOR=X DATA); ELSE FAIL. |
| 18 | IF COMPARATOR RESULT IS FALSE, THEN PASS (SECTOR=Y DATA); ELSE FAIL. |
| 19 | IF COMPARATOR RESULT IS FALSE AND X DATA TYPE IS NOT UNKNOWN, THEN PASS (SECTOR=TRIGGER); ELSE FAIL. |
| 20 | IF STATE INCLUDES REQUESTED AND X DATA TYPE IS UNKNOWN, THEN PASS (SECTOR=SERVICE); ELSE FAIL. |
| 21 | IF STATE DOES NOT INCLUDE REQUESTED OR STATE INCLUDES REQUESTED AND X DATA TYPE IS NOT UNKNOWN AND Y DATA TYPE IS NOT UNKNOWN, THEN PASS; (SECTOR=SERVICE) ELSE FAIL. |
| 22 | IF STATE INCLUDES REQUESTED AND X DATA TYPE IS NOT UNKNOWN, THEN PASS; (SECTOR=X DATA) ELSE FAIL. |
| 23 | IF STATE INCLUDES REQUESTED AND X DATA TYPE IS NOT UNKNOWN, THEN PASS; (SECTOR=SERVICE) ELSE FAIL. |
| 24 | IF STATE INCLUDES REQUESTED AND X DATA TYPE IS UNKNOWN, THEN PASS; (SECTOR=SERVICE) ELSE FAIL. |

When the acknowledge signal is removed, the memory module is finished with the packet, block 400. After cycling through the five possible vectors, processor controller 112 then selects the next address in processor queue 110 as the next source for the cell packet address, blocks 402, 404, FIG. 10, blocks 364 and 374, FIG. 9. This ends the vector packet output cycle.

Returning to the example, FIG. 5, since cell packet 2 was requested and the X data value is unknown, C vector is enabled. Referring to the vector link table, Table VIII, the test for the C vector passes. For example, indexing a C vector with a variable function, VAR, indicates that the test passes because the state of this cell packet includes a request and the X data type is unknown. Under a pass condition, processor controller 112 calls for a vector packet output cycle. This cycle has two results: it reads the C vector of the cell together with the previous processor packet address "2" and then selects the vector adder 160, FIG. 3, for gating the result as the cell packet address. Thus, the "+1" stored in the C vector address is added to the cell address of "2" for assembling a vector packet having a cell address of "3", to identify Cell 3. This vector packet is a vector request and is transferred back to local memory 111, on line 130. This vector request will cause the state for Cell 3 to be set to a requested and queued state, and also cause Cell 3 to be queued in the processor's queue 110. In Cell 3, the X data value is unknown so the local processor will perform a vector operation on the C vector sector, since A vector fails the vector link test of Table VII. This operation causes a request to be made for a cell packet addressed at 0, Cell 0, (3-3=0). It will also cause the processor to assemble a request vector for Cell 1 since the Y data is also unknown.

Thus, for the "greater-than" operation of Cell 3, a request is made to obtain X and Y data values. The X data represents the available truck space, and the Y data represents the cargo size. For this case, the A vector request is only performed when the X and Y data are known and X data is greater than Y data. In other words, Cell 3 is queued for performing the the greater-than function only when the X and Y data values are obtained.

Cells 0 and 1 are now handled by the processor since they contain data necessary to perform their operation. The processor handling Cell 0 does an A vector of "+3" which stores the X value (1000) into the X data sector of Cell 3, and a B vector of "+6" stores the value 1000 into the X data sector of Cell 6 for a subtract function. The processor handling Cell 1 does an A vector of "+7", which puts the X data value (521) into the X data sector of Cell 8. When Cell 8 is queued, the X data value is sent to the Y data sector of Cell 3 and to the Y data sector of Cell 6.

Cell 3 is now queued, since it has all of the necessary data needed to form the greater-than function. Note that Cell 6 is not queued because it has not been requested. The processor then performs a test of greater-than for Cell 3. If this test passes, an A vector is performed which queues up Cell 4. Had this test failed, the B vector would have been performed. However, since there is no B vector, the program would have stopped here because the C and D vectors were already performed. For the present case it is assumed that the test passes, and a request vector of "+1" is performed. This operation queues Cell 4 which in turn performs a request of Cells 5 and 7. These addresses are placed in processor queue 110. When Cell 5 is processed, the available truck space is set. When Cell 7 is processed, the cargo status is set. The processor handles cell 5 first and does a C vector of "+1", since the X data value in the X data sector is unknown. This queues up Cell 6. Since Cell 7 was the next thing queued, Cell 7 does an A vector which sends data in the X data sector to the X data sector of Cell 2. Cell 6 is now queued up by the processor. Since the X and Y values are now known, an A vector is performed. Cell 5 is now queued by the processor and performs an A vector of "−5", since the result of Cell 6 is placed in the X data sector of that cell. The data in the X data sector is now sent to Cell 0, which updates the available truck space. At this point there is nothing placed in the queue so the processor goes idle, and the X data value is read out of Cell 2, since the cargo status is no known.

Although specific features of the invention are shown in some drawings and not others, this is for convenience only as each feature may be combined with any or all of the other features in accordance with the invention.

Other embodiments will occur to those skilled in the art and are within the following claims. For example, although it is preferred that each unit, consisting of a processor module and memory module pair, have a separate microprocessor for each module for maintaining each module's sequencing independence, a single processor may be used for each unit for operating the memory-managed system according to this invention. In the latter embodiment, the functions of each module are performed by implementing computer programs using a time-shared scheme. Further, a number of units can be implemented by a single microprocessor. For instance, the memory-managed system shown in FIG. 2 can be implemented with a single microprocessor. Such a system can also be implemented by hard-wiring components of this system to replace some of the software.

What is claimed is:

1. A processor module for interacting with a memory module in which are stored a plurality of groups of information, each group including a data sector for storing a word, a vector sector for storing a vector word for linking that group to at least one other group, and a function sector which includes both an operation field for storing an operation word that indicates the operation to be performed by the processor module on the data word, and a state field for storing a state word that represents the condition of that group for processing, the processor module comprising:

processing means for receiving from the memory module, when enabled by the memory module, a first group of information designated by the memory module as ready for processing and for selectively processing at least one of said words of the designated group of information;

address generator means for identifying, based on the processing of said one or more words in the designated group of information, a second group of information to be accessed and processed; and processor manager means, responsive to said address generator means and said processing means, for assembling a memory module access request for the identified group of information and for transmitting the access request to the memory module to accomplish one of the providing new information to the identified group of information in the memory module and requesting additional information from the identified group of information in the memory module.

2. The processor module of claim 1 in which said address generator means includes sector generator means for producing a sector address to said processor manager means to identify a requested sector of the identified group of information.

3. The processor module of claim 2 in which said sector address is generated from one of a control signal transmitted to said sector generator means from said processor manager means and an operation word of the designated group of information, and the control signal, the operation word, and a state word of the designated group of information.

4. The processor module of claim 1 in which said processing means includes data generator means for providing data to said processor manager means to assemble the access request so that it includes information which is based on one of previously read data and a mathematical operation performed on the previously read data, as controlled by said processor manager means.

5. The processor module of claim 1 in which said processing means includes processor queue means connected to said memory module for receiving status signals from said memory module for enabling said processing means, said status signals indicating which of the groups of information are ready to be processed.

6. A processor module for generating memory access packets for interacting with a memory module having a plurality of cell packets containing information to be operated on by the processor module, each cell packet including at least one data sector containing a data word, at least one vector sector containing a vector word for linking together other cell packets to be processed, and a function sector including both an operation word for identifying a predetermined function to be performed by the processor module and a state word for indicating the state of the cell packet for processing by the processor module, the processor module comprising:

memory access packet manager means for generating a plurality of control signals based on a previously selected cell packet and for assembling a memory access packet, the memory access packet including a cell packet address and a cell sector address;

address generator means for producing, as commanded by one of the control signals from the memory access packet manager means, an address for the memory access packet based on one of a cell packet address in an address queue within the address generator means and the combination of a previously read vector word and the cell packet address in the address queue;

sector address generator means for producing a sector address for the memory access packet, based on one of another of the control signals from the memory access packet manager means along with an operation word of the previously selected cell packet, and the control signal, the operation word, and a state word of the previously selected cell packet; and said memory access packet manager means transmitting said memory access packet to the memory module when assembly is completed to accomplish one of providing new information to the memory module and requesting additional information from the memory module.

7. The processor module of claim 6 further including data generator means for providing data to said memory access packet manager means for assembling the memory access packet, including information which is based on one of previously read data from a cell packet and a mathematical operation performed on the previously read data, as commanded by a control signal from the memory access packet manager means.

8. The processor module of claim 7 in which said data generator means further includes means for generating a comparison result signal based on previously read data and one of a fixed value and a data value in a data sector of a different cell packet, said memory access packet manager means selecting between said provided data and said comparison result signal to selectively modify the memory access packet.

9. The processor module of claim 6 further including data type generator means for generating a data type for a cell packet function sector based on the operation word and at least one data type word of the cell packet currently being processed by the processor module for classifying the data word to be processed.

10. A processor module for generating memory access packets for interacting with a memory module having a plurality of cell packets, each cell packet containing information to be operated on by the processor module which includes at least one data word, at least one vector word, and a function word that includes both an operation field and a state field, the processor module comprising:

memory access packet manager means for generating a plurality of control signals and for assembling a memory access packet, the memory access packet including a cell packet address;

a processor queue connected to said memory module for receiving status signals from said memory module indicating which of said plurality of cell packets in said memory module are ready to be processed by said processor module;

address generator means for producing and providing a cell packet address to said memory access packet manager means for inclusion in the memory access packet, the cell packet address being based on one of a cell packet address in said processor queue and the combination of a previously read vector word and the cell packet address in said processor queue;

sector generator means for producing a sector address to be included in the memory access packet as commanded by the memory access packet manager means, based on a control signal from the memory access packet manager means and selected fields of the function word;

said memory access packet manager means transmitting said memory access packet to the memory module when assembly is completed to accomplish one of providing new information to the memory module and requesting additional information from the memory module;

data generator means for providing data to said memory access packet manager means for inclusion in the memory access packet, the data being based on one of previously read data from a cell packet and a mathematical operation performed on the previously read data; and said data generator means further including means for generating a comparison result based on a previously read data word and one of a fixed value and a data value in a data sector of a different cell packet, said memory access packet manager means selecting between said provided data and said comparison result to selectively modify the memory access packet.

11. The processor module of claim 10 in which each of said cell packets further includes a data type word that is used to indicate the associated classification of the data word, and in which the processor module further includes data type generator means for generating a data type for the memory access packet to be assembled by said memory access packet manager means based on the operation word and at least one data type word of the cell packet currently being processed by the processor module.

12. A memory-managed computer system comprising:

a plurality of processing units, each unit having a processor module and an associated local memory module;

each said processor module including:

processing means for receiving, when enabled by said local memory module, a first group of information designated by its local memory module as ready for processing, and for selectively processing at least one of said words of the designated group;

address generator means for identifying, based on the processing of said one or more words in the designated group of information, a second group of information to be accessed and processed; and processor manager means, responsive to said address generator means and said processing means, for assembling a memory module access request for the identified group of information and for transmitting the memory module access request to the memory module to accomplish one of providing new information to a selected local memory module of said plurality of processing units and requesting additional information from said local memory module; and each said local memory module including:

memory means for storing a plurality of groups of information, each group including a data word, an operation word for indicating the operation to be performed by the processor module on the data word, and a state word for representing the status of that group for processing by the local memory module associated local processor module;

selection means for accepting an access request from a processor module of said plurality of processing units or an identified group of information and for interpreting the contents of the access request; and state modification means for determining, based on the information within the identified group in said memory means and the interpretation of the access request by said selection means, when the identified group of information is ready to be processed by the local memory module associated local processor module, for updating the status of the identified group of information by selectively modifying the state word, and for selectively signalling the local memory module associated local processor module when the identified group of information is ready to be processed.

13. The memory-managed computer system of claim 12 in which said processing means further includes sector generator means for producing a sector address to said processor manager means to identify a requested sector of the identified group of information.

14. The memory-managed computer system of claim 13 in which said sector address is generated from one of a control signal transmitted to said sector generator means from the processor manager means and an operation word of the designated group of information, and the control signal, the operation word, and a state word of the designated group of information.

15. The memory-managed computer system of claim 12 in which each said processing means further includes data generator means for providing data to said processor manager means for assembling the access request so that it includes information which is based on one of previously read data and a mathematical operation performed on the previously read data, as controlled by the processor manager means.

16. The memory-managed computer system of claim 12 in which said processor module includes processor queue means connected to the processor module associated local memory module for receiving enabling signals from said local memory module, said enabling signals including status signals and cell address signals for indicating to said processor manager means subsequent groups of information which are ready to be processed.

17. The memory-managed computer system of claim 12 in which said selection means selectively writes at least a portion of the contents of the access request into the identified group of information in said memory means.

18. The memory-managed computer system of claim 12 in which each group of information stored in one of the memory means further includes at least one vector word for linking that group of information to at least one other group of information.

19. The memory-managed computer system of claim 18 in which said other group of information is stored in one of that memory means and a memory module of an adjacent processing unit.

20. The memory-managed computer system of claim 18 in which said processor manager means assembles, as part of the access request, an address for the identified group of information and the memory module further includes means for combining the vector word with the address of the identified group of information for linking said identified group of information to other groups of information.

21. The memory-managed computer system of claim 20 in which each group of information is organized into sectors having unique sector addresses including a data sector for storing the data word, a function sector for storing the operation word and the state word, and at least one vector sector for storing each vector word.

22. The memory-managed computer system of claim 21 in which said processor manager means assembles, as a part of the access request, a vector packet including an address for the identified group of information, a sector address for that group of information, a data word, and a data type word for indicating the classification of the data word.

23. The memory-managed computer system of claim 22 in which said memory module further includes means for writing the data from the vector packet into the data sector of the identified group of information and the data type into the function sector of said identified group of information.

24. The memory-managed computer system of claim 21 in which said processor manager means assembles, as a part of the access request, a processor packet having an address for the identified group of information and a sector address for that group of information for accessing information from an identified group of information.

25. The memory-managed computer system comprising:
a plurality of processing units, each processing unit having a processor module and a local memory module;
means for interconnecting each processor module of each processing unit to its associated local memory module and to a memory module of at least one other of said plurality of processing units for transferring processed information to be stored by one of the memory modules;
said local memory modules of said processing units including means for organizing stored information into groups of information, for informing only its associated processor module that a group of information is ready to be processed, and for making that group of information available only to the associated processor module of that processing unit for processing.

* * * * *